UNITED STATES PATENT OFFICE 2,239,563

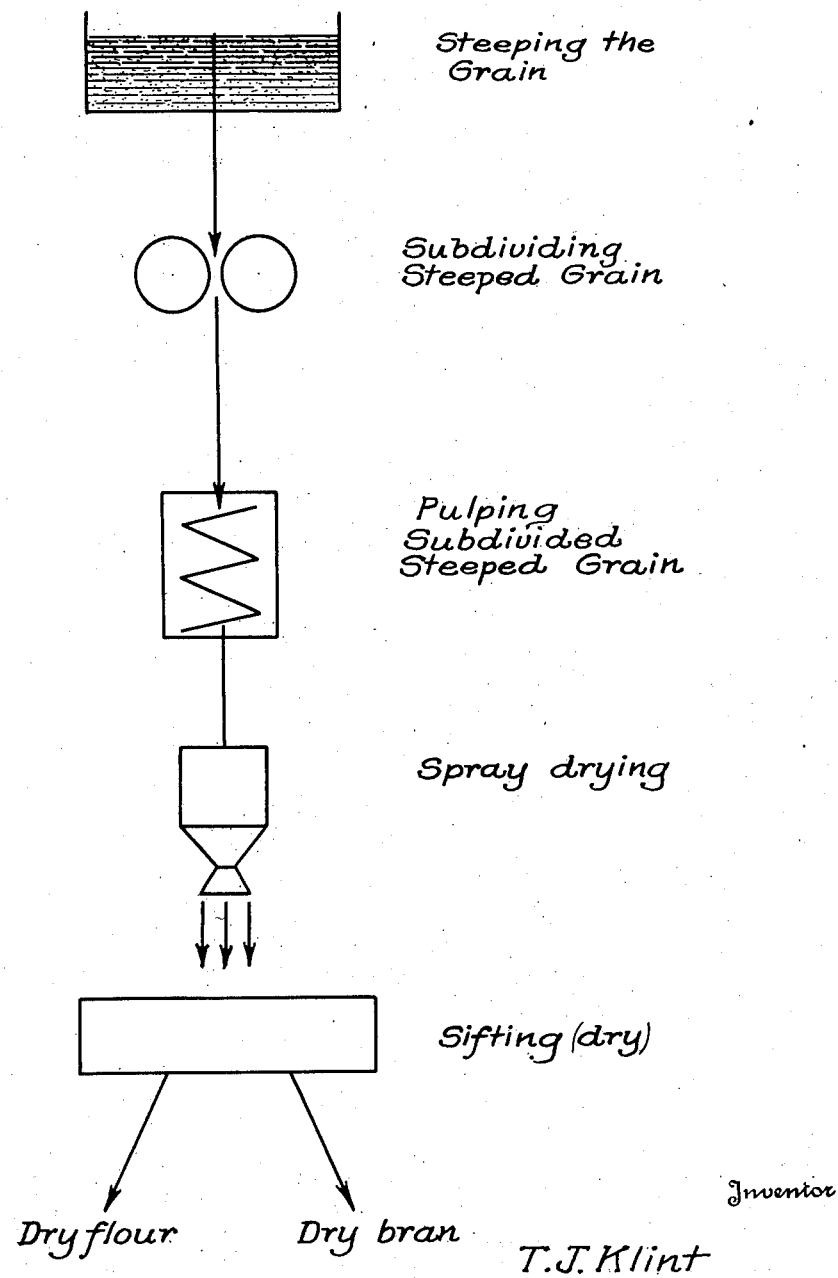

PROCESS FOR THE PRODUCTION OF FLOUR FROM GRAIN

Tage Jensen Klint, Munke Molle, Odense, Denmark

Application June 11, 1938, Serial No. 213,281
In Great Britain June 16, 1937

2 Claims. (Cl. 83—42)

The present invention relates to an improved method of producing flour from various kinds of grain. The hitherto employed method consists in grinding the grain and subsequently sifting the resulting product for the separation of the fine flour, comprising gluten and starch, from the husk portions. By this method it is not possible to remove completely from the husk the layer of endosperm containing the main portion of vitamines and salts, the fine flour being short of these substances.

The main objects of the present invention are:
(1) To provide an increased yield of flour,
(2) To transfer to the flour the main portion of B-vitamines and salts contained in the grain, and
(3) To improve the baking properties of the flour.

With these objects in view the invention consists essentially in steeping the whole grain, or a coarse powder of them, and thereupon working them to a paste or pulp in such a manner that the husk portions are not reduced to the same fineness as the starch and gluten particles, which paste or pulp is spray dried in a hot air current to a powder containing flakes or coarse particles of the husk portions which are removed from the powder by sifting.

The steeping of the grain is effected after it has been cleansed in known manner, but without any other previous treatment.

The objects of the invention may alternatively be attained by macerating merely the husk-containing part sifted off from flour obtained by grinding grain in the usual manner. The paste or pulp thus obtained is treated in the manner described above. The flour thus produced which is rich in vitamines, is thereupon mixed with flour produced either in any hitherto known manner or produced in accordance with the present invention. It is thus possible to produce a flour with a greater proportion of vitamines than is normally obtained.

In order to obtain a uniform powder, and accordingly a finer flour product, it is advisable, prior to the spray drying process, to give the paste or pulp produced by the aforesaid method a more homogeneous character by any known means, for instance by forcing it through narrow slits.

The accompanying drawing diagrammatically illustrates the process.

I declare that what I claim is:

1. In a process for producing flour from grain, the steps of first steeping the grain at a temperature too low to cook the same, finely subdividing the steeped grain and more coarsely subdividing the husk portions thereof than the other portions, working said coarsely subdivided husk portions and said finely subdivided other portions into a pulp sufficiently liquid to be spray-dried, spray drying this pulp, and sifting the flour from the husk particles.

2. A method of treating the endosperm-carrying husk portion of grain sifted from the flour after grinding, comprising the steps of steeping said endosperm-carrying husk portion and maintaining it below a cooking temperature during said steeping, forming a pulp from said steeped endosperm-carrying husk portion sufficiently liquid to be spray-dried, spray drying said pulp and sifting the flour from the relatively coarse husk particles.

TAGE JENSEN KLINT.